United States Patent [19]
Teshirogi

[11] Patent Number: 4,883,343
[45] Date of Patent: Nov. 28, 1989

[54] LIQUID CRYSTAL DISPLAY ELEMENT HAVING A $Cr_2O_3$ THIN FILM FOR PREVENTING DAZZLEMENT

[75] Inventor: Toshiyuki Teshirogi, Iwaki, Japan

[73] Assignee: Alps Electric Co., Ltd., Tokyo, Japan

[21] Appl. No.: 173,662

[22] Filed: Mar. 25, 1988

[30] Foreign Application Priority Data

Jul. 13, 1987 [JP] Japan .................. 62-107386

[51] Int. Cl.$^4$ ................................ G02F 1/13
[52] U.S. Cl. ....................... 350/338; 350/339 R
[58] Field of Search ............ 350/336, 337, 338, 339 R

[56] References Cited

U.S. PATENT DOCUMENTS 4,139,278  2/1979  Matsumoto et al. ............ 350/350 R
4,456,336  6/1984  Chung et al. ..................... 350/338
4,683,183  7/1987  Ono ................................... 350/334
4,741,603  5/1988  Miyagi et al. ..................... 350/357

FOREIGN PATENT DOCUMENTS 0254023  12/1985  Japan ................................. 350/338
1385448  of 1975  United Kingdom ............... 350/338
2064805  6/1981  United Kingdom ............... 350/338

Primary Examiner—Stanley D. Miller
Assistant Examiner—Huy K. Mai
Attorney, Agent, or Firm—Guy W. Shoup; Paul J. Winters; Stephen L. Malaska

[57] ABSTRACT

A liquid crystal display element having a liquid crystal cell formed by bonding a pair of transparent substrates, and a polarizing plate disposed at least outside of the transparent substrate of display surface comprising a $Cr_2O_3$ thin film formed 300 to 1000 Angstroms thick on the outer surface of the transparent substrate of the display surface. Thus, the liquid crystal display element can effectively prevent a dazzlement due to the reflection of an external light on the surface of a transparent substrate of display surface side.

2 Claims, 1 Drawing Sheet

LIQUID CRYSTAL DISPLAY ELEMENT HAVING A $Cr_2O_3$ THIN FILM FOR PREVENTING DAZZLEMENT

BACKGROUND OF THE INVENTION

1. Field of the Invention

This invention relates to a liquid crystal display element for preventing the dazzlement by the reflection of an external light on the surface thereof.

2. Description of the Prior Art

A liquid crystal display element is composed, as shown for example in FIG. 2, by bonding a pair of transparent substrates 1 and 2 made of glass plates or the like as a cell, pouring a liquid crystal in the cell to form a liquid crystal cell 3, and, in case of a transmission type, attaching polarizing plates 4 and 5 made of oriented films to both side surfaces of the liquid crystal cell 3. In case of a reflection type, a reflecting plate is formed on the outside of the polarizing plate 5 of the back surface side.

In case of the transmission type, the transmission of the light from a light source installed on the back surface side is controlled by the liquid crystal cell 3 to variably display, while in a reflection type liquid crystal arrangement, a transmission of external light is controlled by a liquid crystal cell and its light is reflected by a reflection plate to perform various displaying actions.

However, in such a liquid crystal display element, it has such a disadvantage that the external light L is reflected on the polarizing plate 4 at the front surface side or on the surface of the transparent substrate 1 and a dazzlement occurs by the reflected light so that the display is scarcely observed. Particularly, in an automotive liquid crystal display element or a camera liquid crystal display element, the reflected light becomes, when used under a direct sunshine, stronger, and the display is frequently unseen.

Therefore, it is proposed to variously treat an antidazzling treatment on the surface of the polarizing plate 4 of the display surface side. Heretofore, it is general as such an antidazzling treatment to form a fine uneven surface by any means on the surface of the polarizing plate 4 to reflect the external light L at random. For example, (1) a method of embossing (pressing) by heating and pressurizing, (2) a method of chemically etching, (3) a method of sandblasting, and (4) a method of screen printing a transparent resin and forming an uneven surface made of mesh locus (Japanese Patent Laid-open No. 11780/1986) are disclosed.

The external light is reflected at both surfaces of the polarizing plate 4 and the transparent substrate 1. That is, total reflection light is a combination of a reflection light from the polarizing plate 4 and the reflection light from the transparent substrate 1. Due to the above fact, even if an antidazzling treatment is applied to the surface of the polarizing plate 4, it is not possible to completely prevent the reflection of light from the transparent substrate 1.

SUMMARY OF THE INVENTION

Accordingly, an object of this invention is to provide a liquid crystal display element which eliminates the above-mentioned drawbacks and can effectively prevent a dazzlement due to the reflection of an external light on the surface of a transparent substrate of display surface side.

In order to achieve the above and other objects of the invention, there is provided according to the present invention a liquid crystal display element having a liquid crystal cell formed by bonding a pair of transparent substrates, and a polarizing plate disposed at least outside of the transparent substrate of display surface comprising a $Cr_2O_3$ thin film formed 300 to 1000 Angstroms thick on the outer surface of the transparent substrate of the display surface.

It is considered to form an uneven surface by any means on the surface in the same manner as the antidazzling treatment on the surface of the polarizing plate as described above when the antidazzling treatment is executed on the surface of the transparent substrate of display surface side, but when the uneven surface is executed on the surface of the transparent substrate of display surface side, the light passed through the liquid crystal cell is disordered at random on the uneven surface. Thus, there occurs various drawbacks that the characteristics of the polarizing plate formed on the surface by the uneven surface of the transparent substrate.

This invention eliminates the drawbacks described above by forming a thin film of $Cr_2O_3$ of 300 to 1000 Angstroms thick by a sputtering method or a vacuum depositing method on the surface of the transparent substrate of display surface side and can effectively prevent the dazzlement due to the reflected light on the surface of the transparent substrate of display surface side. The reason why the antidazzling effect is obtained by the thin film of $Cr_2O_3$ is because the thin film of $Cr_2O_3$ absorbs the external light. The $Cr_2O_3$ layer may absorb not only an external light but an internal light as well.

The thickness of the thin film of $Cr_2O_3$ is preferably 300 to 1000 Angstroms, preferably 500 to 800 Angstroms. If the thickness is less than 300 Angstroms, the antidazzling effect is not sufficient, while if the thickness exceeds 1000 Angstroms, the light transmission factor becomes low so that the display becomes dark. The thin film of $Cr_2O_3$ can be readily formed, for example, by a sputtering method or a vacuum depositing method known per se.

In the preferred embodiments, the thin film of $Cr_2O_3$ is formed on the surface of the glass substrate of display surface side, and the antidazzling treatment described above is executed on the surface of the polarizing plate of display surface side. This antidazzling treatment can be achieved, for example, by various means described above, such as the formation of a fine uneven surface on the surface of the polarizing plate. In this manner, when the antidazzling treatment is executed also on the surface of the polarizing plate, the dazzlement due to the reflection of the external light can be further effectively prevented.

The above and other related objects and features of the invention will be apparent from a reading of the following description of the disclosure found in the accompanying drawings and the novelty thereof pointed out in the appended claims.

DESCRIPTION OF THE PREFERRED EMBODIMENT

Figure 1:
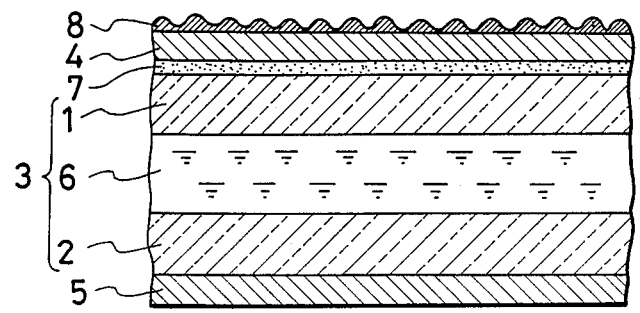
FIG. 1 is a sectional view showing an embodiment of a liquid crystal display element according to the present invention.
Figure 2:
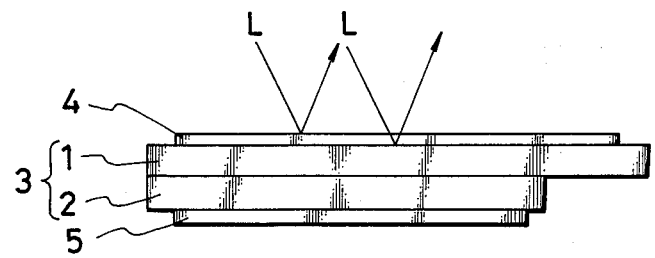
FIG. 2 is a side view of the example of a conventional liquid crystal display element.

An embodiment of a liquid crystal display element according to the present invention will be described in detail with reference to FIG. 1.

A liquid crystal display element of the invention is composed of a liquid crystal cell 3 interposed through a liquid crystal 6 between transparent substrates 1 and 3 made of glass plates. A thin film 7 of $Cr_2O_3$ is formed 700 Angstroms thick by a sputtering method on the surface of the transparent substrate 1 of display surface side. A polarizing plate 4 made of an oriented film is bonded further to the outside of the transparent substrate 1. A polarizing plate 5 made similarly of the oriented film is bonded to the outside of the transparent substrate 2 of back surface side. Further, resin solution which contains 65 wt.% of vinyl chloride resin and 30 wt.% of solvent is screen printed 9 microns thick by a printing mesh of 200 meshes in size on the surface of the polarizing plate 4 of display surface side, the solvent is volatilized to form an uneven layer 8 by hardening the resin.

In the liquid crystal display element, the reflectivity of an external light on the display surface is 6% as a whole. On the other hand, in the liquid crystal display element formed without the thin film 7 of $Cr_2O_3$ in the above constitution, the reflectivity of an external light on the display surface is 16% as a whole. When the display is actually observed, the liquid crystal display element of the invention does not dazzle even under direct sunshine to obtain preferable visibility.

According to the present invention as described above, the thin film of $Cr_2O_3$ of 300 to 1000 Angstroms thick is formed by the sputtering method or a vacuum depositing method on the outer surface of the transparent substrate of display surface. Therefore, the reflectivity of the external light on the surface of the transparent substrate is reduced, and preferable antidazzling effect is obtained, for example, even under direction sunshine. Consequently, this is particularly adaptive for a liquid crystal display element used in a vehicle or a camera to be used under direct sunshine.

What is claimed is:

1. A liquid crystal display element having a liquid crystal cell formed by bonding front and rear transparent substrates, and a polarizing plate disposed on a display surface of the front transparent substrate comprising a $Cr_2O_3$ thin film disposed on the display surface of the front transparent substrate.

2. A liquid crystal display element according to claim 1, wherein the thickness of the thin film of $Cr_2O_3$ is in a range of 300 to 1000 Angstroms.

* * * * *